(12) United States Patent
van den Brink

(10) Patent No.: US 11,338,741 B2
(45) Date of Patent: May 24, 2022

(54) CAMERA MIRROR VEHICLE MOUNTING SYSTEM

(71) Applicant: Orlaco Products B.V., Barneveld (NL)

(72) Inventor: Alfred van den Brink, Barneveld (NL)

(73) Assignee: ORLACO PRODUCTS B.V., Barneveld (NL)

( * ) Notice: Subject to any disclaimer, the term of this patent is extended or adjusted under 35 U.S.C. 154(b) by 11 days.

(21) Appl. No.: 16/787,362

(22) Filed: Feb. 11, 2020

(65) Prior Publication Data

US 2020/0262362 A1    Aug. 20, 2020

Related U.S. Application Data

(60) Provisional application No. 62/805,527, filed on Feb. 14, 2019.

(51) Int. Cl.
*B60R 11/04* (2006.01)
*B60J 3/02* (2006.01)
*G03B 17/56* (2021.01)

(52) U.S. Cl.
CPC .............. *B60R 11/04* (2013.01); *B60J 3/023* (2013.01); *G03B 17/561* (2013.01)

(58) Field of Classification Search
CPC ......... B60R 11/04; G03B 17/561; B60J 3/023
See application file for complete search history.

(56) References Cited

U.S. PATENT DOCUMENTS

| | | | |
|---|---|---|---|
| 4,966,404 A | 10/1990 | Lund | |
| D384,019 S | 9/1997 | Meryman et al. | |
| 5,836,640 A * | 11/1998 | Hurayt | B62D 29/048 296/180.2 |
| 6,099,064 A * | 8/2000 | Lund | B60J 3/002 296/152 |
| D442,901 S | 5/2001 | Conway et al. | |

(Continued)

FOREIGN PATENT DOCUMENTS

| | | |
|---|---|---|
| CN | 20452699 U | 8/2015 |
| CN | 205890754 U | 1/2017 |

(Continued)

OTHER PUBLICATIONS

International Search Report and Written Opinion for International Application No. PCT/EP2020/053642 dated Apr. 17, 2020.

(Continued)

*Primary Examiner* — Noam Reisner
(74) *Attorney, Agent, or Firm* — Carlson, Gaskey & Olds, P.C.

(57) ABSTRACT

A vehicle camera mounting system includes, among other things, a first bracket portion that has a first attachment feature that is configured to be secured to an exterior of a vehicle. The first bracket portion extends laterally from the first attachment feature to a second attachment feature. The first attachment feature is provided by a plate that has apertures that are configured to receive fasteners that secure the first bracket portion to the vehicle. The second attachment feature is configured to mount to the vehicle at a location remote from the plate. The system further includes a camera assembly that is secured to the second attachment feature.

15 Claims, 5 Drawing Sheets

(56) References Cited

U.S. PATENT DOCUMENTS

| | | | |
|---|---|---|---|
| 6,530,620 B1* | 3/2003 | Turney | B60J 3/002 |
| | | | 160/DIG. 3 |
| D679,233 S | 4/2013 | Balicki et al. | |
| 9,198,575 B1 | 12/2015 | Blacutt et al. | |
| 9,517,734 B2 | 12/2016 | Seger et al. | |
| 2007/0200663 A1 | 8/2007 | White et al. | |
| 2007/0239992 A1 | 10/2007 | White et al. | |
| 2018/0229646 A1* | 8/2018 | Van Buren | F21V 21/30 |

FOREIGN PATENT DOCUMENTS

| | | | |
|---|---|---|---|
| CN | 106683229 A | 5/2017 | |
| EP | 1550580 A1 | 7/2005 | |
| EP | 1813476 A2 | 8/2007 | |
| JP | 2008137494 A | 6/2008 | |
| TW | M348708 U | 1/2009 | |
| WO | 2019233575 A1 | 12/2019 | |
| WO | WO-2019233575 A1 * | 12/2019 | B60J 3/002 |

OTHER PUBLICATIONS

International Preliminary Report on Patentability for International Application No. PCT/EP2020/053642 dated Aug. 26, 2021.

* cited by examiner

CAMERA MIRROR VEHICLE MOUNTING SYSTEM

CROSS-REFERENCE TO RELATED APPLICATIONS

This application claims priority to U.S. Provisional Application No. 62/805,527 which was filed on Feb. 14, 2019, and is incorporated herein by reference.

BACKGROUND

This disclosure relates to a camera mirror vehicle mounting system.

There is increased driver and manufacturer interest in mirror replacement systems, particularly in the commercial trucking industry. These systems employ multiple rearward facing cameras that display views typically provided by at least the side view mirrors, which obviate the need for the side view mirrors. Benefits include improved functionality as well as improved aerodynamics by eliminating of the traditional large side view mirrors.

Present camera mounting systems use individual small brackets secured directly to each side of the vehicle to support each camera assembly. Mounting features, e.g., holes drilled by the system installer, must be provided on the vehicle to support these brackets. These holes may permit water to enter the vehicle if they are not properly sealed. Moreover, wires associated with each camera are separately passed into the vehicle cabin creating additional potential points for water intrusion.

The cameras must be calibrated during installation onto the vehicle to ensure the desired field of view is provided. Preferably, calibration is done in a quick, repeatable manner, which is more readily achievable in a production environment. Camera calibration can be particularly challenging for aftermarket installations, which may occur in more uncontrolled environments.

SUMMARY OF THE INVENTION

In one exemplary embodiment, a vehicle camera mounting system includes, among other things, a first bracket portion that has a first attachment feature that is configured to be secured to an exterior of a vehicle. The first bracket portion extends laterally from the first attachment feature to a second attachment feature. The first attachment feature is provided by a plate that has apertures that are configured to receive fasteners that secure the first bracket portion to the vehicle. The second attachment feature is configured to mount to the vehicle at a location remote from the plate. The system further includes a camera assembly that is secured to the second attachment feature.

In a further embodiment of any of the above, the system includes a second bracket portion. A sun visor is mounted to the second bracket portion.

In a further embodiment of any of the above, the first bracket portion includes multiple discrete plates that are spaced laterally from one another. Each of the plates provide the first attachment feature. The apertures in the plates are configured to align with preexisting mounting points in the vehicle.

In a further embodiment of any of the above, the fasteners are threaded fasteners that are configured to attach the plates through the apertures to threaded anchors that provide the preexisting mounting points.

In a further embodiment of any of the above, the first bracket portion is provided by a bar that extends from a one second attachment feature on one side of the vehicle to another second attachment feature on an opposite side of the vehicle from the one side. A camera assembly is secured to each of the one and the other second attachment features.

In a further embodiment of any of the above, the system includes a wire bundle that is connected to the camera assemblies and supported by the first bracket portion. The wire bundle is secured relative to the first bracket portion underneath the sun visor.

In a further embodiment of any of the above, the first and second bracket portions and the sun visor are fixed relative to one another in a fully assembled condition.

In a further embodiment of any of the above, the first and second bracket portions are discrete from one another and secured to one another by the fasteners.

In a further embodiment of any of the above, the system includes multiple second bracket portions. One of the second bracket portions overlaps one of the plates.

In another exemplary embodiment, a method of installing a camera system onto a vehicle includes, among other things, mounting a first bracket portion to a vehicle exterior above a windshield at mounting points. The first bracket portion extends to driver and passenger sides of the vehicle. The method further includes securing first and second camera assemblies to the first bracket portion respectively on the first and second sides of the vehicle.

In a further embodiment of any of the above, the method includes the step of affixing a sun visor onto a second bracket portion that is supported by the first bracket portion.

In a further embodiment of any of the above, the first and second bracket portions and the sun visor are fixed relative to one another in a fully assembled condition. The first and second bracket portions are discrete from one another and secured to one another by threaded fasteners.

In a further embodiment of any of the above, the first bracket portion includes multiple discrete plates spaced lateral from one another. Each of the plates provide the first attachment feature. The plates include apertures that are configured to align with mounting points in the vehicle and include the step of attaching the plates through the apertures with fasteners to threaded anchors that provide the mounting points.

In a further embodiment of any of the above, a wire bundle is connected to the first and second cameras. The wire bundle is supported relative to the first bracket portion and includes the step of passing the wire bundle through a single opening in the vehicle. The method further includes the step of connecting the wire bundle to first and second displays in the vehicle. The first and second displays are configured to provide Class II and Class IV views respectively.

In a further embodiment of any of the above, the first bracket portion is provided by first and second bars that are discrete from one another. The first and second cameras are respectively mounted to the first and second bars.

In a further embodiment of any of the above, the first bracket portion has laterally spaced apart end plates. The securing step includes adjusting a position of each of the first and second cameras relative to its respective end plate and securing the first and second cameras to their adjusted positions.

In a further embodiment of any of the above, the end plates are affixed relative to the vehicle with adhesive.

In another exemplary embodiment, a vehicle having a windshield and laterally spaced apart driver and passenger sides, the vehicle includes, among other things, a first bracket portion that is mounted to a vehicle exterior above a windshield at mounting points. The first bracket portion extends to the driver and passenger sides. First and second cameras are secured to the first bracket portion respectively on the first and second sides. A wire bundle is connected to the first and second cameras. The wire bundle is supported relative to the first bracket portion. The wire bundle passes through an opening in the vehicle. First and second displays are arranged in the vehicle and connected to the wire bundle. The first and second displays are configured to provide Class II and Class IV views respectively.

In a further embodiment of any of the above, the vehicle includes a second bracket portion that is supported by the first bracket portion. A sun visor is affixed to the second bracket portion.

In a further embodiment of any of the above, the first and second bracket portions and the sun visor are fixed relative to one another in a fully assembled condition. The first and second bracket portions are discrete from one another and secured to one another by threaded fasteners.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
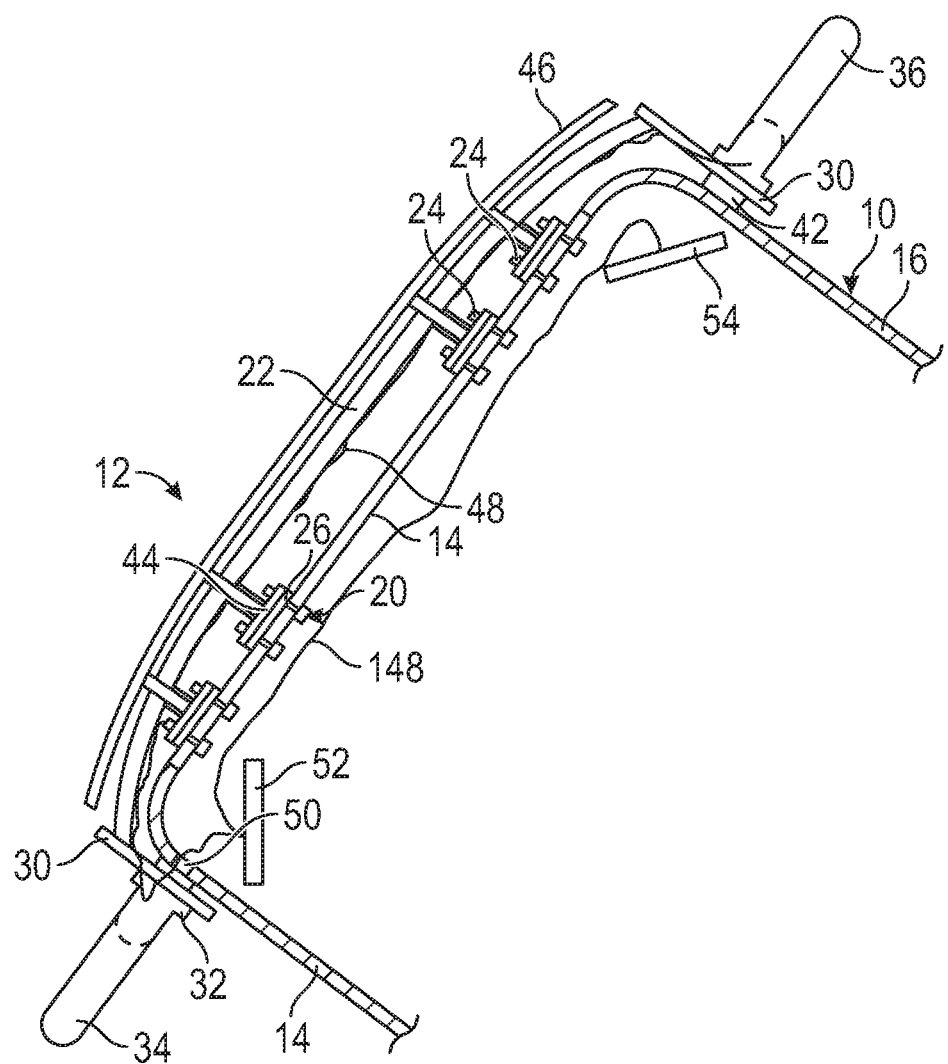
FIG. 1A is a schematic view of one example camera mirror vehicle mounting system.

FIG. 1A schematically illustrates a vehicle cab 10 in cross-section. The vehicle cab 10 includes a front 12 having a windshield 14 and first and second sides 16, 18, which correspond to driver and passenger sides of the vehicle cab 10.

Some vehicle cab manufacturers provide preexisting mounting points 20, which may be used for attaching accessory components, such as a sun visor. The sheet metal or fiberglass at the mounting points 20 may have preexisting reinforcements. Reinforcements can be added if not provided at mounting locations. In one embodiment of this disclosure, the camera mirror vehicle mounting system takes advantage of these preexisting mounting points 20 such that drilling and creation of potential water ingress locations does not occur. Mounting points 20 may also be provided on the roof of the vehicle cab 10 in addition to or instead of at the front of the vehicle cab 10.

Figure 1B:
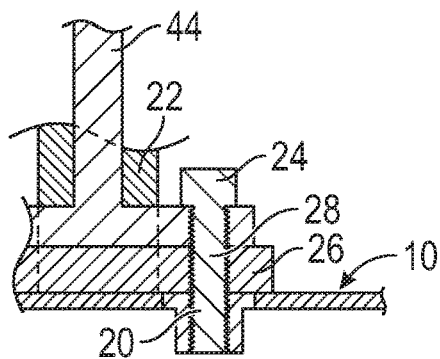
FIG. 1B is an enlarged portion of FIG. 1A illustrating first and second bracket portions secured to a vehicle cab.
Figure 4:
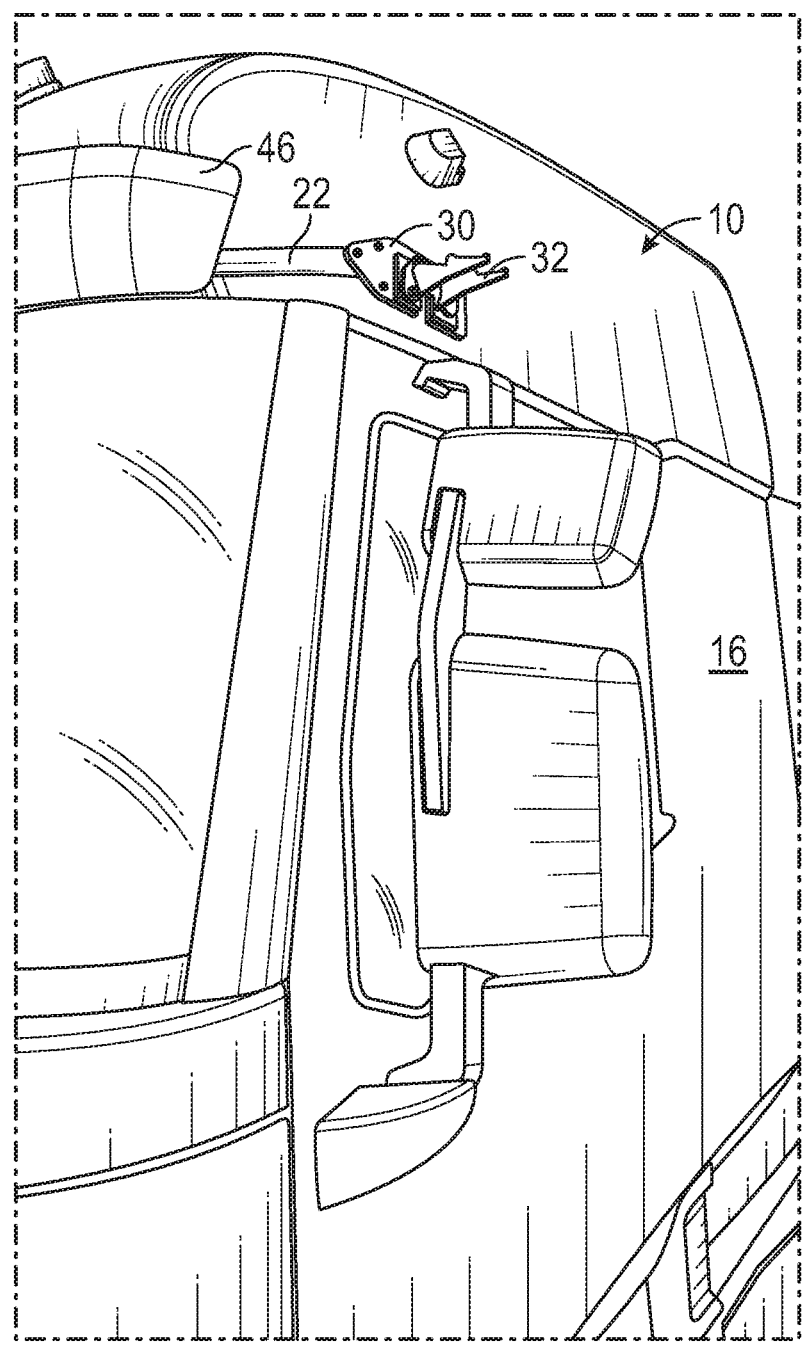
FIG. 4 is a side view of one end of the first bracket portion with a camera assembly removed.
Figure 5:
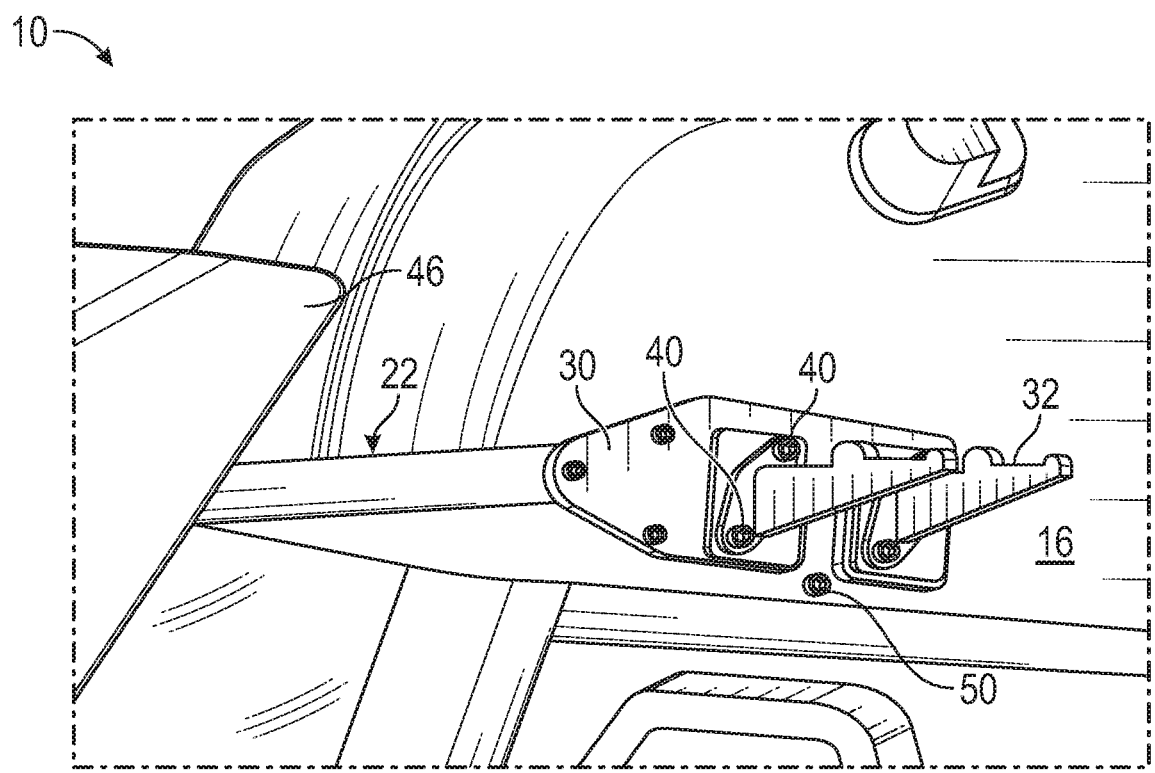
FIG. 5 is an enlarged view of an end of the first bracket portion shown in FIG. 4.

The camera mirror vehicle mounting system includes a first bracket portion 22 having multiple discrete spaced apart plates 26 that are secured to the preexisting mounting points 20 by fasteners 24. The fasteners 24 extend through apertures 28 in the plates 26 (FIG. 1B). In one example shown in FIG. 1A, the first bracket portion 22 is provided by a single bar having a curvature generally corresponding to the contour of the front 12. The bar may terminate in spaced apart end plates 30 that support camera brackets 32, as shown in FIGS. 4 and 5. In one example, the bar is a hollow metal tube.

Figure 6:
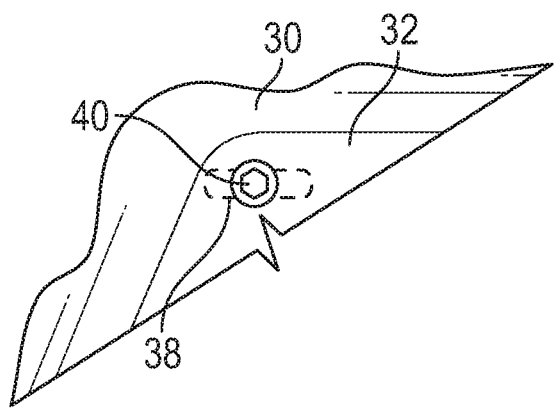
FIG. 6 is an enlarged schematic view of a camera bracket secured to the first bracket portion.

First and second camera assemblies 34, 36 are secured to their respective camera bracket 32. Slotted holes 38 (FIG. 6) may be provided in the camera brackets 32 to permit a coarse adjustment of the camera assemblies during a calibration procedure by loosening and then tightening fasteners 40 during adjustment. The camera assemblies 34, 36 are secured to the camera brackets 32 by fasteners (not shown), which enables easy replacement of the camera assemblies if they become damaged.

There are no preexisting mounting points beneath the end plates 30 in some manufacturer's vehicle cabs. In such instances when it is undesirable to create mounting points for the end plates, e.g., by drilling, an interference fit may be used between the end plates 30 and the vehicle cab 10. A compressible material 42 may be provided between the end plates 30 and the exterior of the vehicle cab 10. In this manner, the vehicle cab 10 may be positioned between the opposing compressible materials 42, creating an interference fit, which securely maintains the position of the camera assemblies with respect to the vehicle cab 10 to avoid undesired vibration. In one example, the compressible material 42 has an adhesive on each side, which secures to the vehicle 10 and the end plate 30, which further stabilizes the end plate position.

At least one plate 26 provides a first attachment feature, and at least one end plate 30 provides a second attachment feature. Neither of the first and second attachment features, which are remote from one another for overall system stability, rely upon specially drilled holes for the mounting of the system. Only preexisting holes from the OEM are used to secure the system to the vehicle. Using preexisting holes provided from the OEM manufacture of the vehicle enables the system to be reliably and repeatably mounted to vehicles in an aftermarket setting.

Figure 2:
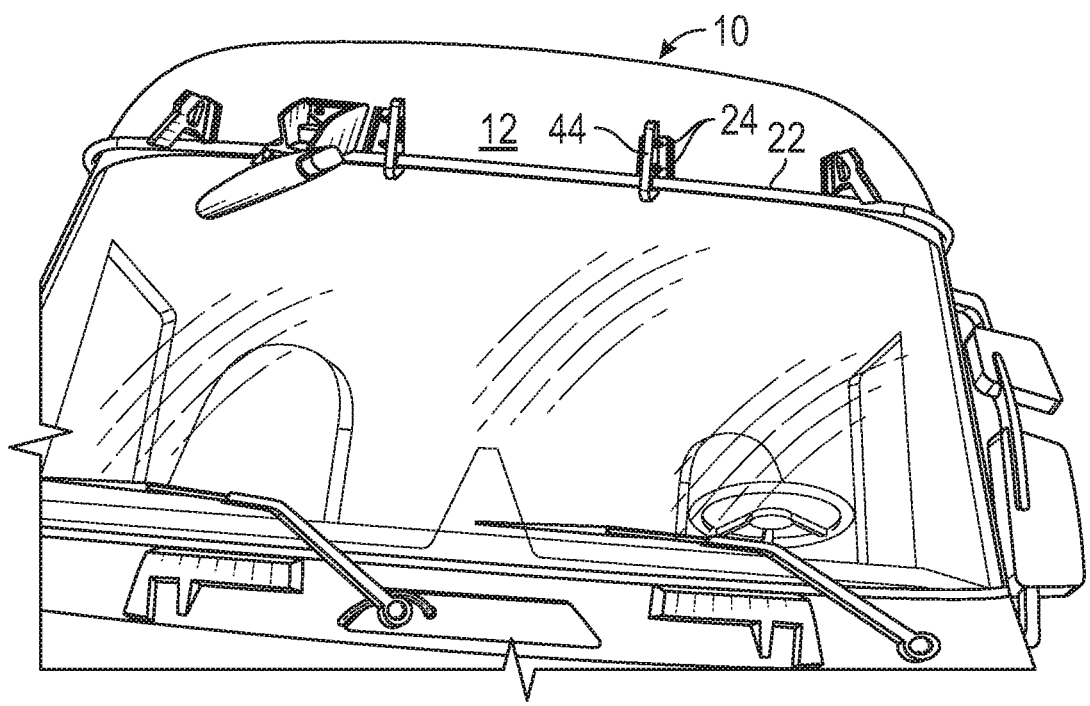
FIG. 2 is a front view of the vehicle with a sun visor removed.
Figure 3:
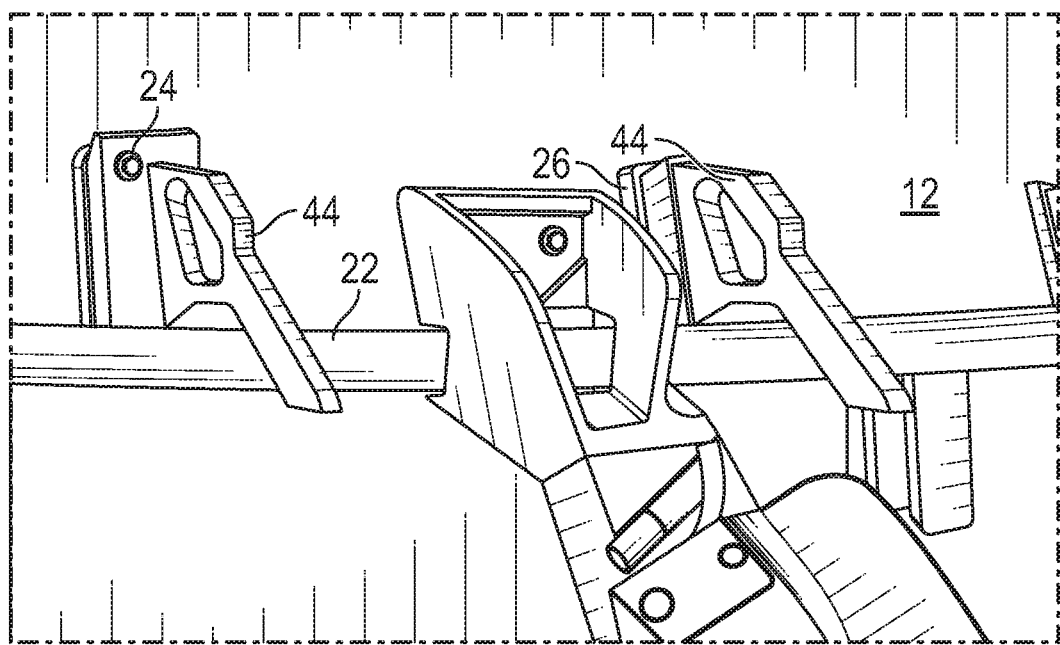
FIG. 3 is an enlarged view of the first and second bracket portions used in the camera mirror vehicle mounting system.

The vehicle manufacturer or aftermarket suppliers may provide second bracket portions 44 (FIGS. 2-3) and a sun visor 46 as part of an aftermarket kit for certain vehicle manufacturer configurations. The first bracket portion 22 and its various mounting locations may be configured to not only take advantage of the vehicle cab 10 preexisting mounting points 20 (i.e., provided by the OEM during manufacturing) but also the available bracketry and sun visor contours available in the after-market or by the original equipment manufacturer. In the example, the second bracket portions 44 are arranged in an overlapping relationship with the plates 26 and are secured using the fasteners 24. The sun visor 46 is secured to the second bracket portion 44. Although the first and second bracket portions 22, 44 are shown as separate, discrete elements from one another, the bracket portions may be integrated, if desired.

A wire bundle 48 is interconnected between the first and second camera assemblies 34, 36. This wire bundle 48 may be secured to the exterior of the first bracket portion 22 by, for example, zip ties. Alternatively, the wire bundle 48 may be arranged within the first bracket portion 22 if it is provided as a hollow bar. The wire bundle 48 may terminate in a single, common pig tail, which is then passed through a hole 50 in the vehicle cab 10. The installer may have to drill a hole into the vehicle for the wiring, although such a hole need not be precisely located and is easily sealed with a rubber grommet or the like. As shown in FIG. 1, this wire bundle 48 is joined to a wire harness 148 connected to first and second displays 52, 54, which respectively provide Class II and Class IV views, respectively, to the driver. One or more displays may be provided for Class VI and/or Class V views, if desired. The camera(s) used for Class V and/or Class V views may also be supported by the first bracket portion 22.

Figure 1C:
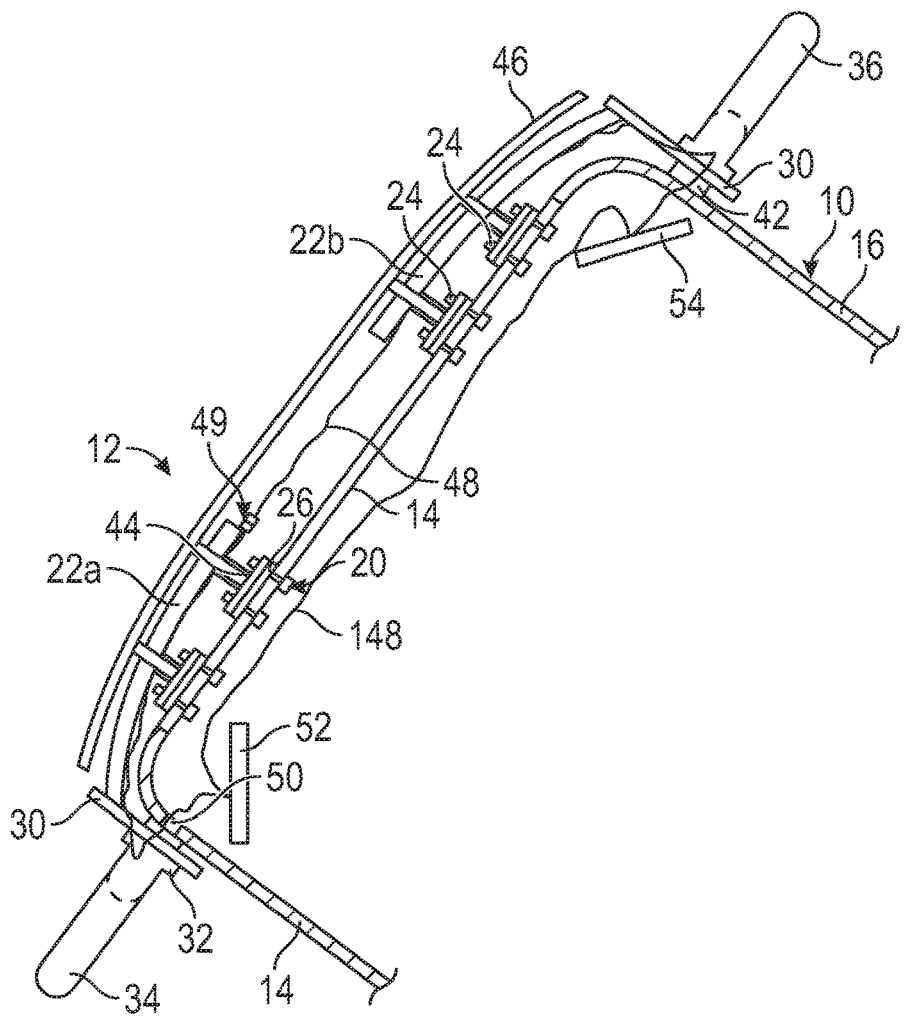
FIG. 1C is a schematic view of a mounting system with a pair of discrete bars providing a pair of first bracket portions.

In another example shown in FIG. 1C, a pair of discrete bars provide a pair or first bracket portions 22a, 22b, one for each side of the vehicle. Each of the first bracket portions 22a, 22b include a pair of the plates 26 for securing the bars to the vehicle. Separate bars provides improved adjustability and enables one installer to more easily mount the first bracket portions 22a, 22b to the vehicle, one at a time. The end plates 30 can be secured to the vehicle 10, as described above. If a common wiring bundle 48 is used for both of the first and second camera assemblies 34, 36, then a wire connector 49 can be used to simplify assembly of the system during aftermarket assembly.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A vehicle camera mounting system comprising:
   a first bracket portion having a first attachment feature configured to be secured to an exterior of a vehicle above a windshield, the first bracket portion extends laterally from the first attachment feature to spaced apart second attachment features providing end plates, the first attachment feature is provided by a discrete plate having apertures configured to receive fasteners securing the first bracket portion to the vehicle, and the second attachment feature is configured to mount to the vehicle at a location remote from the discrete plate;
   a camera assembly secured to each of the second attachment feature, each of the camera assemblies having an adjustable position relative to its respective end plate and to which the each of the camera assemblies is secured;
   a second bracket portion in overlapping relationship to the discrete plate; and
   a sun visor mounted to and arranged over the second bracket portion
   a compressible material arranged between each of the end plates and the exterior of the vehicle such that the vehicle is be positioned between the opposing compressible materials creating an interference fit to securely maintain position of the camera assemblies with respect to the vehicle without drilling.

2. The system of claim 1, wherein the first bracket portion includes multiple discrete plates spaced laterally from one another, each of the discrete plates provide the first attachment feature, the apertures in the discrete plates configured to align with preexisting mounting points in the vehicle.

3. The system of claim 2, wherein the fasteners are threaded fasteners configured to attach the discrete plates through the apertures to threaded anchors that provide the preexisting mounting points.

4. The system of claim 1, wherein the first bracket portion is provided by a bar extending from a one second attachment feature on one side of the vehicle to another second attachment feature on an opposite side of the vehicle from the one side, and a camera assembly is secured to each of the one and the other second attachment features.

5. The system of claim 1, comprising a wire bundle connected to the camera assemblies and supported by the first bracket portion, wherein the wire bundle is secured relative to the first bracket portion underneath the sun visor.

6. The system of claim 1, wherein the first and second bracket portions and the sun visor are fixed relative to one another in a fully assembled condition.

7. The system of claim 6, wherein the first and second bracket portions are discrete from one another and secured to one another by the fasteners.

8. The system of claim 7, comprising multiple second bracket portions, wherein one of the second bracket portions overlaps one of the discrete plates.

9. A method of installing a camera system onto a vehicle, comprising the steps of:
   mounting a first bracket portion to a vehicle exterior above a windshield at mounting points, the first bracket portion extending to driver and passenger sides of the vehicle;
   securing first and second camera assemblies to the first bracket portion respectively on the first and second sides of the vehicle;
   wherein the first bracket portion has laterally spaced apart end plates, and the securing step includes adjusting a position of each of the first and second cameras relative to its respective end plate and securing the first and second cameras to their adjusted position; and
   providing a compressible material between each of the end plates and an exterior of the vehicle such that the vehicle is be positioned between the opposing compressible materials creating an interference fit to securely maintain position of the camera assemblies with respect to the vehicle without drilling.

10. The method of claim 9, comprising the step of affixing a sun visor onto a second bracket portion that is supported by the first bracket portion.

11. The method of claim 10, wherein the first and second bracket portions and the sun visor are fixed relative to one another in a fully assembled condition, and the first and second bracket portions are discrete from one another and secured to one another by threaded fasteners.

12. The method of claim 9, wherein the first bracket portion includes multiple discrete plates spaced lateral from one another, each of the plates provide the first attachment feature, the plates including apertures configured to align with mounting points in the vehicle, and comprising the step of attaching the plates through the apertures with fasteners to threaded anchors that provide the mounting points.

13. The method of claim 9, wherein a wire bundle is connected to the first and second cameras, the wire bundle is supported relative to the first bracket portion, and comprising the step of passing the wire bundle through a single opening in the vehicle, comprising the step of connecting the wire bundle to first and second displays in the vehicle, the first and second displays configured to provide Class II and Class IV views respectively.

14. The method of claim 9, wherein the first bracket portion is provided by first and second bars that are discrete from one another, the first and second cameras respectively mounted to the first and second bars.

15. The method of claim 9, wherein the end plates are affixed relative to the vehicle with adhesive.

\* \* \* \* \*